W. C. McKEOWN.
RADIATOR ASSEMBLING MACHINE.
APPLICATION FILED AUG. 2, 1907.
1,020,150.
Patented Mar. 12, 1912.
6 SHEETS—SHEET 3.
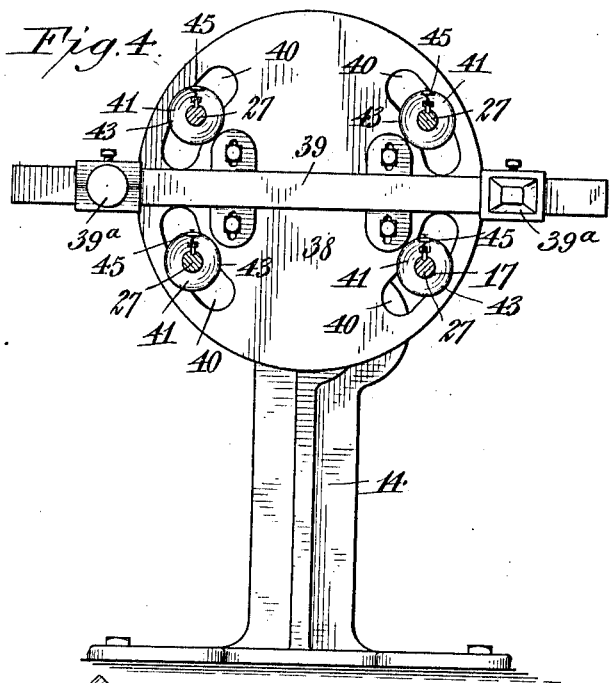
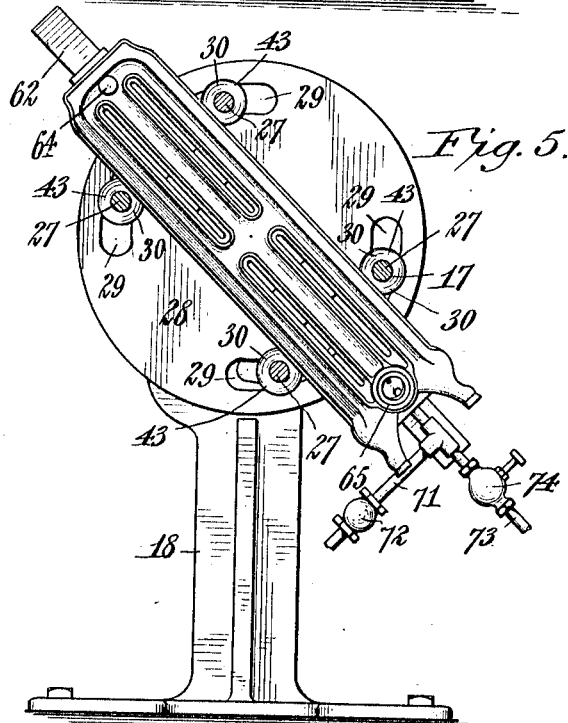
Witnesses:
Christ Feinle.
Harry D. Rapp.
William C. McKeown, Inventor.
By Emil Neuhart, Attorney.

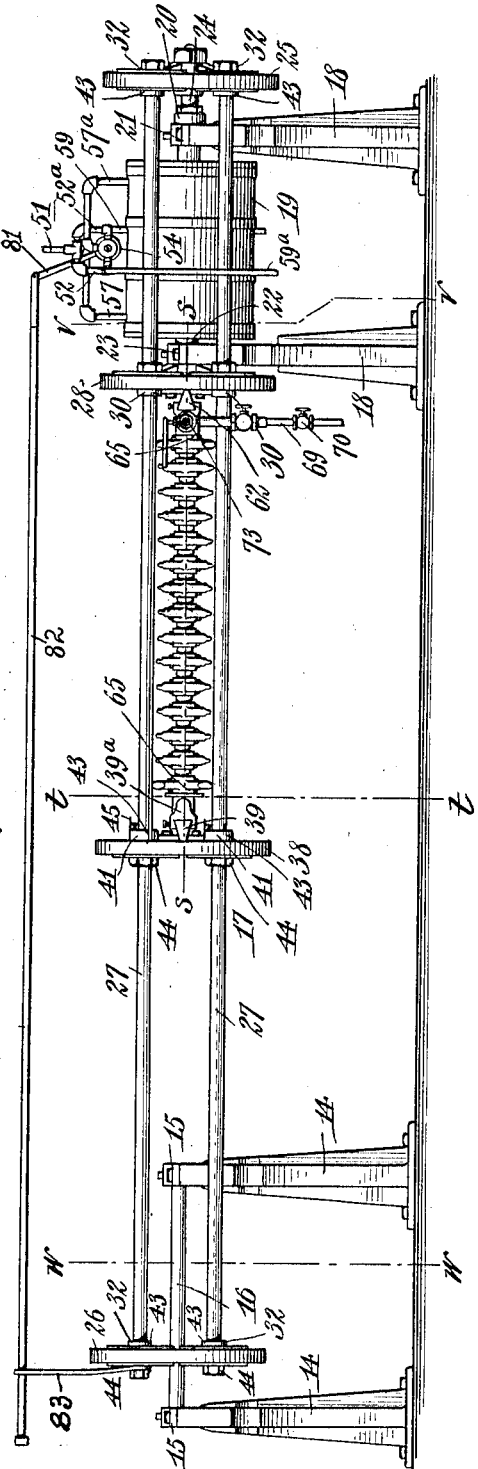

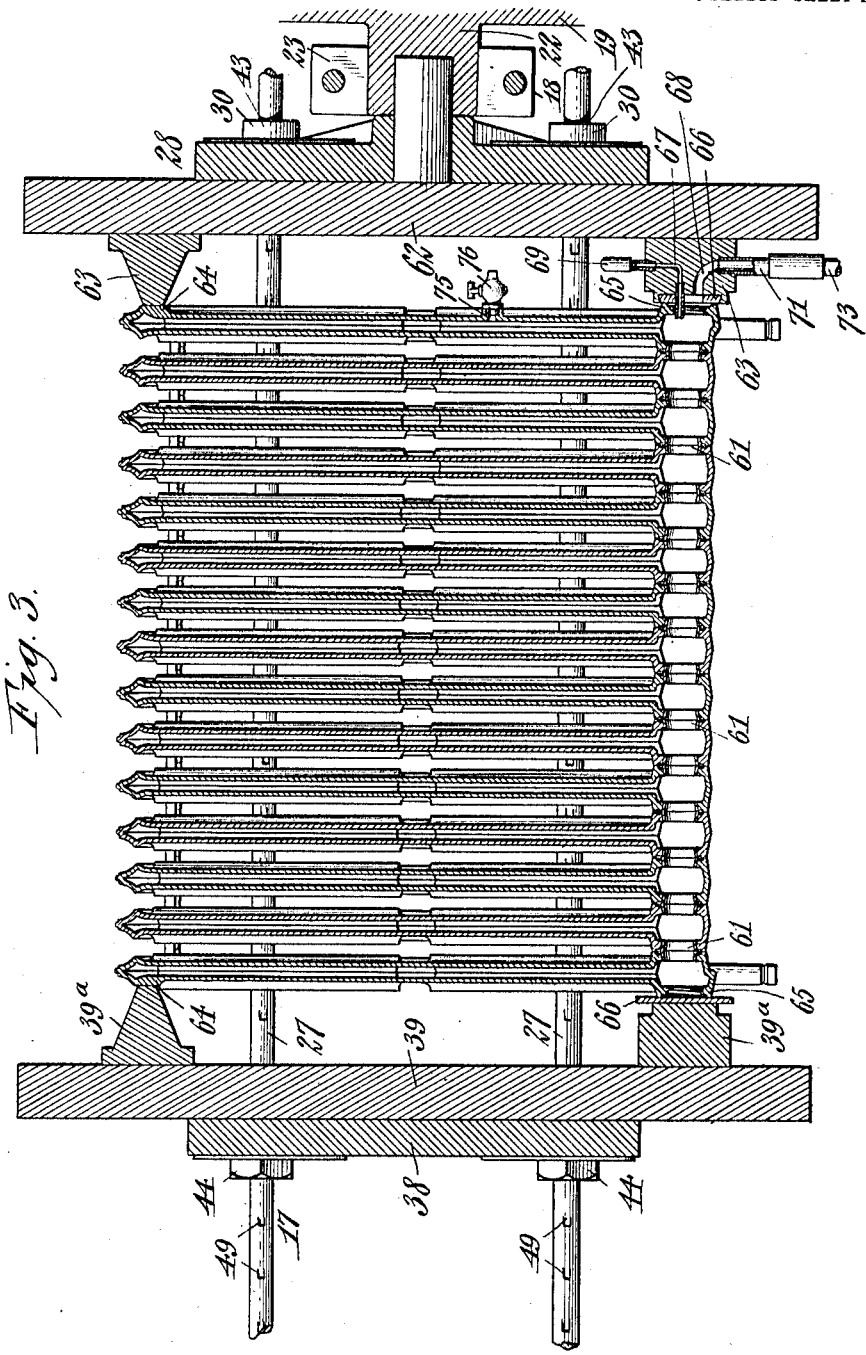

W. C. McKEOWN.
RADIATOR ASSEMBLING MACHINE.
APPLICATION FILED AUG. 2, 1907.

1,020,150.

Patented Mar. 12, 1912.
6 SHEETS—SHEET 4.

Witnesses:
Christ Finle.
Harry D. Rapp.

William C. McKeown, Inventor:
By Emil Neuhart, Attorney.

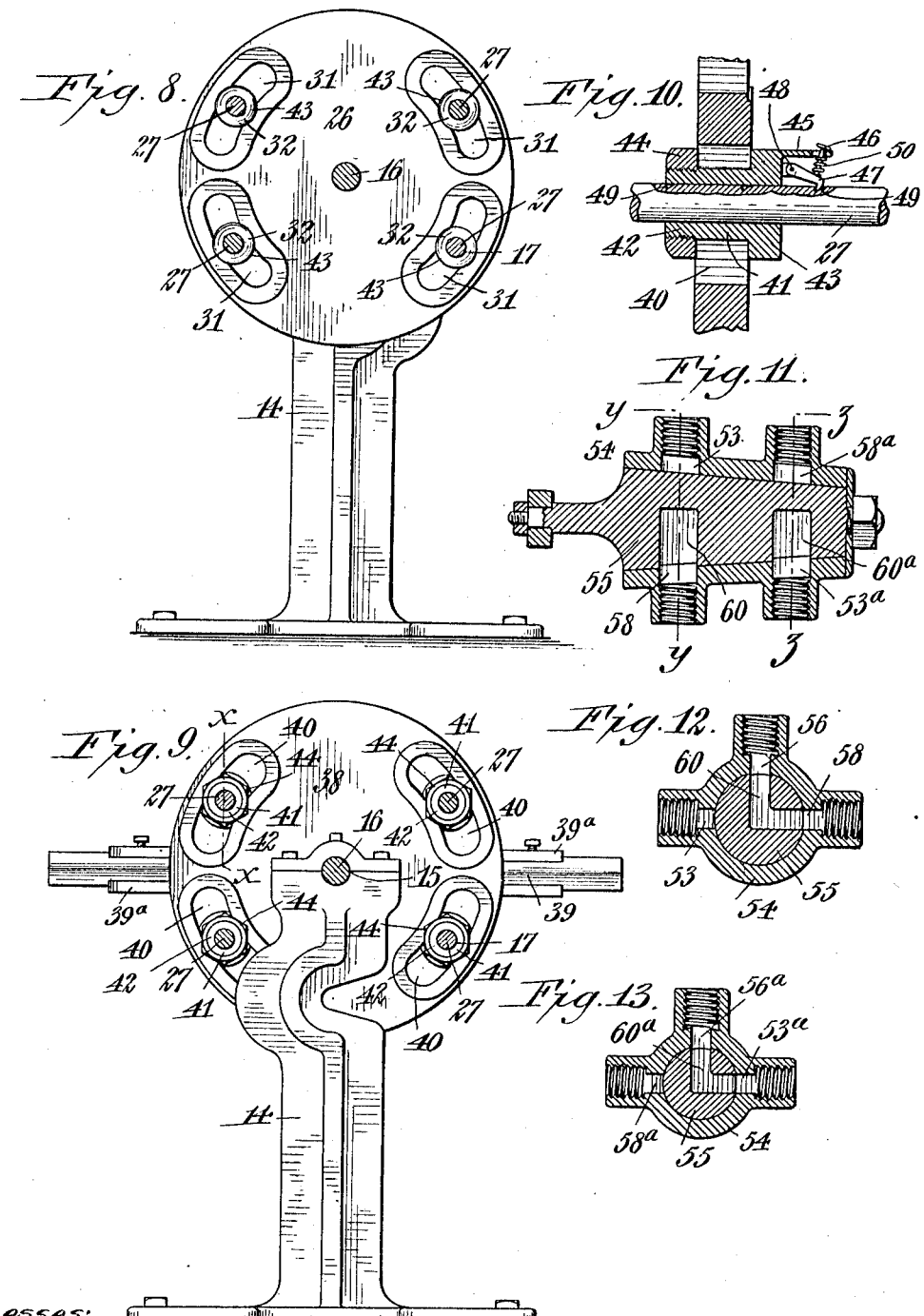

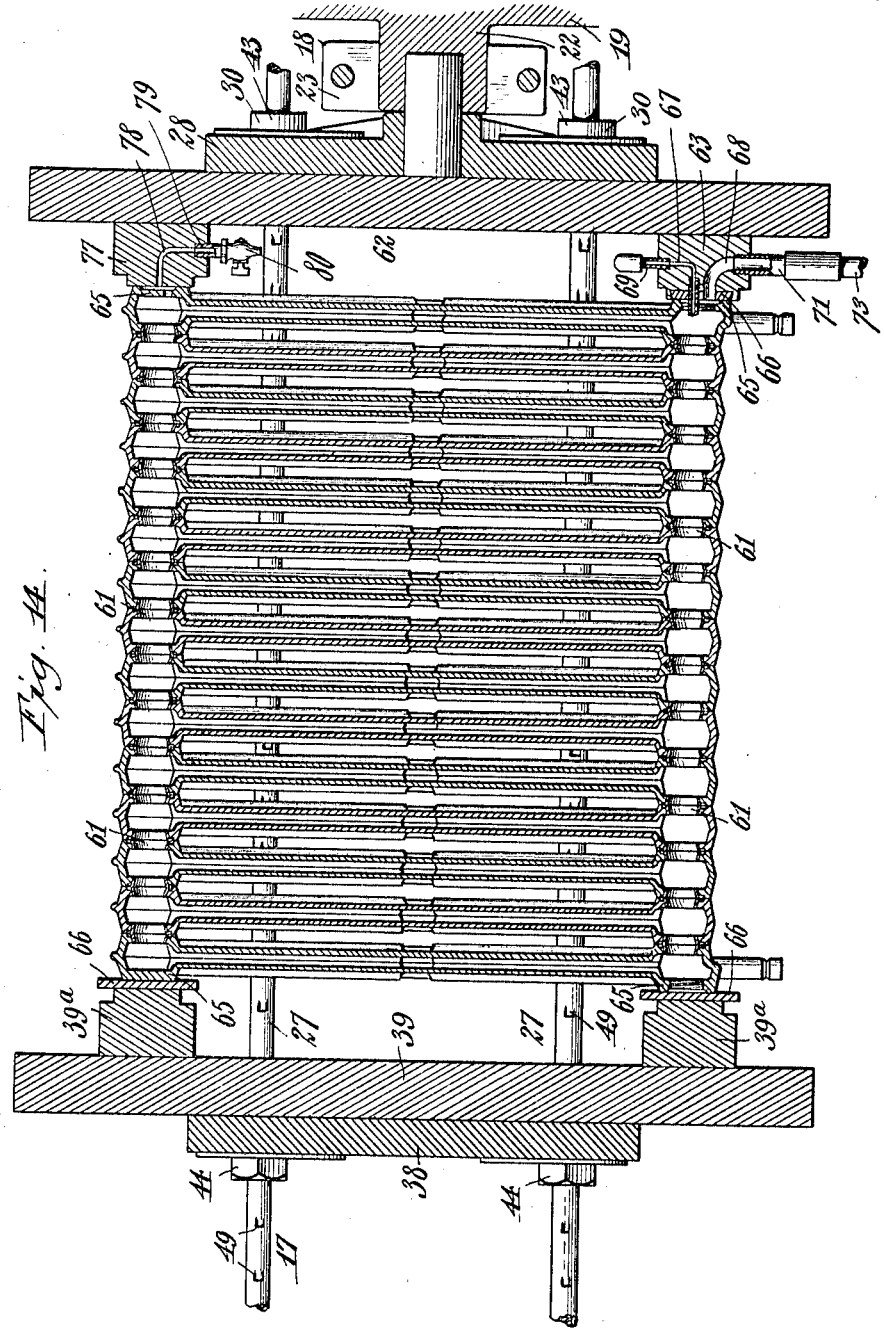

UNITED STATES PATENT OFFICE.

WILLIAM C. McKEOWN, OF BUFFALO, NEW YORK, ASSIGNOR TO BUFFALO RADIATOR COMPANY, OF BUFFALO, NEW YORK, A CORPORATION OF NEW YORK.

RADIATOR-ASSEMBLING MACHINE.

1,020,150.  Specification of Letters Patent.  Patented Mar. 12, 1912.

Application filed August 2, 1907. Serial No. 386,757.

*To all whom it may concern:*

Be it known that I, WILLIAM C. MCKEOWN, a citizen of the United States, residing at Buffalo, in the county of Erie and State of New York, have invented new and useful Improvements in Radiator-Assembling Machines, of which the following is a specification.

My invention relates to an improved radiator assembling-machine for connecting sectional radiators.

The primary object of my invention is, the production of an assembling-machine whereby the several sections of a sectional radiator may be quickly and conveniently assembled and connected with assurance that the sections will be properly alined, and connected in a water-tight manner.

Other objects are, to provide an assembling-machine whereby the sections are drawn together into connected condition, in contradistinction to the old method of pushing them together which is liable to cause them to become disalined; to provide a rotatable support for the radiator sections so that when they are assembled and connected they may be carefully examined at every point without removing them from the machine; to combine with the assembling-mechanism, means for testing the radiator under pressure; and to provide for quickly and conveniently adjusting the machine to receive and effectively assemble and connect any number of sections.

Further objects are to make the support for the sections adjustable so that sections of any height may be assembled and connected; to control the power-mechanism from any point in the length of the machine; to provide a rigid head that acts as an abutment for one end section and has air and water communication with the interior of the assembled and connected sections; to provide a follower which is drawn toward the abutment by a power-device in rear of said abutment; and to otherwise improve on machines for this purpose heretofore in use.

My invention consists in the combination and arrangement of devices, and in the construction, arrangement and combination of parts to be hereinafter described and particularly pointed out in the appended claims.

Figure 6:
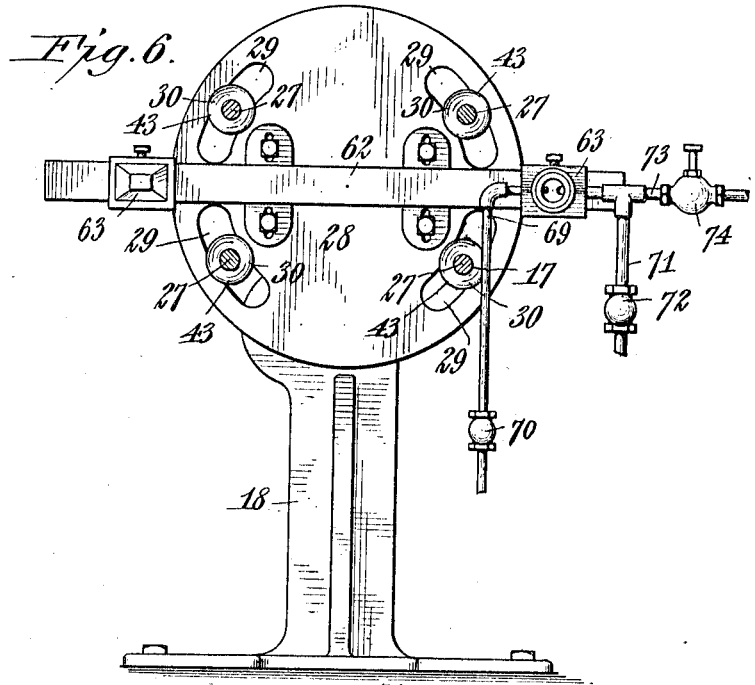
Figure 7:
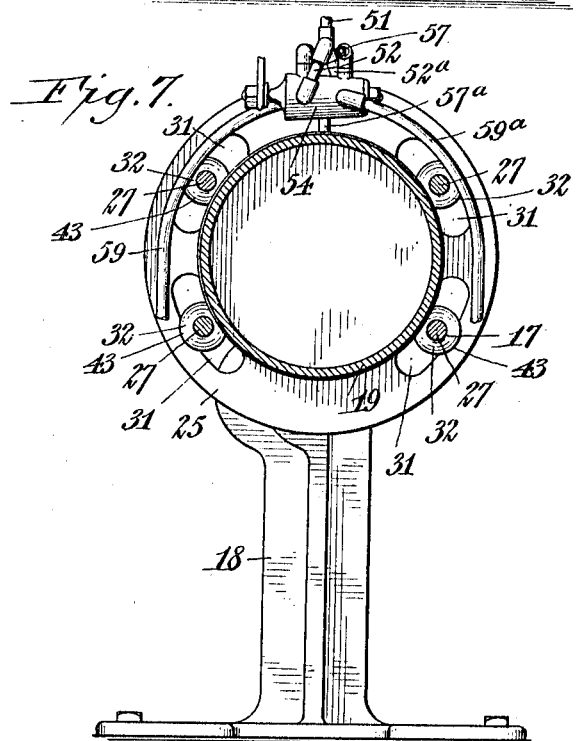

In the drawings,—Figure 1 is a side elevation of an assembling-machine embodying my invention in a representative way; a plurality of radiator sections being shown supported thereon. Fig. 2 is a plan view of the same with the radiator sections removed. Fig. 3 is an enlarged horizontal section taken on line *s—s*, Fig. 1; the several radiator sections being assembled and connected. Fig. 4 is an enlarged transverse section taken on line *t—t*, Fig. 1; looking toward the left. Fig. 5 is an enlarged transverse section on line *t—t*, Fig. 1, looking toward the right and showing the radiator-support turned to incline the radiator supported thereon. Fig. 6 is a section similar to Fig. 5 with the radiator-support in normal position and the radiator removed. Fig. 7 is an enlarged transverse section through the power-cylinder on line *v—v*, Fig. 1. Figs. 8 and 9 are transverse sections taken on line *w—w*, Fig. 1; looking in opposite directions. Fig. 10 is an enlarged vertical longitudinal section taken on line *x—x*, Fig. 9. Fig. 11 is a central longitudinal section of the controlling-valve. Fig. 12 is a section taken on line *y—y*, Fig. 11. Fig. 13 is a section taken on line *z—z*, Fig. 11. Fig. 14 is a section similar to Fig. 3, showing a water-radiator and the manner of assembling and connecting the same.

Referring now to the drawings in detail, like numerals of reference refer to like parts in the several figures.

The reference numeral 14 designates a pair of standards at one end of the machine, each of which has a box 15 at its upper end in which a guide-rod 16 is fixedly secured and acts to guide one end of a supporting-frame 17 on which the several sections of a radiator are to be laid preparatory to connecting the same.

Two standards 18 are located at the opposite end of the machine, and between these a power cylinder 19 is located; the latter has a stuffing-box 20 on one of its heads which is held in a box 21 at the upper end of one of said standards and a boss 22 on its other head which is held in a box 23 at the upper end of the other of said standards. In this manner the cylinder is rigidly secured and it has its axis coincident with that of the guide-rod 16 at the opposite end of the machine. Within the cylinder is a reciprocating piston of ordinary construction to which is secured a piston-rod 24 that passes through the stuffing box 20 of the cylinder and has its outer extremity affixed to a head 25 in a manner to permit the latter to rotate thereon but to compel said head to reciprocate with said rod.

A head 26 is slidable on guide-rod 16 and it is connected with head 25 by four parallel bars 27; said heads and bars constituting the supporting-frame 17 which reciprocates with the piston and is rotatable independent of the latter.

An abutment 28 is fixedly secured to the inner standard 18 and it has four segmental slots 29 equipped with bushings 30 which are adjustable in said slots and through which the supporting-bars 27 are passed. Heads 25 and 26 have similar segmental slots 31 which are provided with bushings 32 adjustable within said slots.

The several sections of the radiator are laid upon the two lower bars 27 which are in a plane beneath the axis of the abutment so that the longitudinal center of the radiator is approximately coincident with said axis. One end section of the radiator to be assembled and connected is first laid upon the two lower bars and placed against said abutment and the remaining sections are then laid upon said bars with tapering nipples entering the alined openings of said sections. After the several sections constituting the radiator are assembled, an adjustable follower 38 is moved against the other end section. Said follower has a header 39 adjustably secured thereto which has laterally adjustable bearing-blocks 39$^a$ that bear against said last mentioned end section, and said follower also has segmental slots 40 in which bushings 41 are adjustably held through which the bars 27 are passed. Each of said bushings in said heads 25 and 26 and follower 38 and the bushings in the abutment 28 comprise a cylindrical body or sleeve 42 which has a flange 43 at one end that bears against one side of the follower, head, or abutment, and at its other end it is exteriorly threaded to receive a nut 44 that bears against the other side of said follower, head, or abutment, as the case may be. Upon slightly unscrewing said bushings, they may be adjusted to any position in the segmental slots; thereby bringing the bars 27 closer together or separating them more, as may be necessary for the different heights of radiator sections. Each of the bushings of the follower also has an extension 45 through which a headed pin 46 is passed whose lower end is secured to a pawl 47 pivoted to the bushing, at 48, and having its free in engagement with one of a series of notches 49, on each of the rods 27. Around said pin, between said extension and the pawl is a coil-spring 50 which serves to hold the pawl in engagement with the proper notch in the corresponding bar. Each of the notches 49 has one of its walls at a right-angle to the directions of movement of the follower and its other wall inclined; thereby permitting adjustment of the follower toward the abutment by pressure in that direction. It is apparent therefore that the follower can be quickly adjusted to any length of radiator.

51 designates a supply-pipe for the power-medium, which may be air, steam, water, or any other agency to cause the piston to reciprocate within the cylinder; but I have arranged the machine herein illustrated, for use of water as the power-agent. The supply-pipe 51 is connected by branch-pipes 52, 52$^a$, with two inlet ports 53, 53$^a$ of a valve-casing 54 having a rotatable valve 55 therein; and from ports 56, 56$^a$, in said casing, pipes 57, 57$^a$ are led to opposite ends of the power-cylinder. Outlet ports 58, 58$^a$ are provided in the valve-casing into which discharge pipes 59, 59$^a$ are threaded that lead to the sewer or any other suitable point. It is to be noted that the inlet ports are on opposite sides of the valve-casing, and opposite each inlet-port an outlet-port is located. The valve has two L-shaped passages 60, 60$^a$, and one or the other of the ends of said passages are always in registration with the ports 56, 56$^a$. As shown in Figs. 12 and 13, the water under pressure enters port 53$^a$, passes through the L-shaped passage 60$^a$, out the port 56$^a$, and through pipe 57$^a$ into one end of the power-cylinder, thereby forcing the piston toward the opposite end, causing the water in the last-mentioned end of the cylinder to pass through the pipe 57, into port 56, through L-shaped passage 60, and out port 58 into discharge-pipe 59$^a$. On turning the valve one-quarter of a revolution to the left, the action of the piston would be reversed and as the support 27 is connected with the piston and the follower 38 is carried on the support, the movement of the piston in one direction causes the several radiator sections to be drawn together, and during such action they are connected in a water-tight manner by nipples 61 that are tapered in opposite directions from a point midlength as shown in Fig. 3 and consequently act to securely tie the several sections of the radiator together. Movement of the piston in an opposite direction causes the follower to be moved away from the abutment and allows the completed radiator to be removed.

I consider the assembling and connecting of radiator-sections by a pulling action to be a very important feature of this invention, as it assures proper introduction of the connecting-nipples into the alined openings of the several sections and perfect alinement of the latter, and it almost entirely eliminates leaky joints between the sections.

The abutment 28 is provided with a header 62 which is adjustable thereon and when the lower bars of the supporting-frame are adjusted to a lower plane with a view of bringing them closer together for supporting radiator sections of less height, header 62 and the header 39 of the follower are lowered also to center them with the longitudinal center of the radiator sections. Header 62 has transversely adjustable bearing blocks 63; and these blocks and the bearing-blocks 39ª on the header of the follower are adapted to bear against the upper and lower ends of the end sections, preferably against bosses 64 and the circular flanges 65 around the openings in the end sections, as shown in Fig. 3; the blocks closing said opening being provided with leather or other suitable facing or packings 66 so that said openings are closed in a water-tight manner. One of the blocks of the header on the abutment has two passages therein, one an air-passage 67 and the other a water-passage 68, both in communication with the interior of the connected sections by reason of their opening into the opening of the adjacent end section. An air-supply pipe 69 is connected to passage 67 and has a valve 70 therein, and a water supply-pipe 71 is connected to passage 68 and has a valve 72 therein. A water discharge-pipe 73 is connected with the supply-pipe 71 and is led to the sewer or other convenient point for discharging the water from the radiator; it having a valve 74 at a point between its discharge end and its point of connection to the water supply-pipe. One end section is provided with the usual threaded pet-cock opening 75 into which a pet-cock 76 is screwed. When testing the machine, the valve 70 in the air-supply pipe and the valve 74 in the water-discharge-pipe are closed; the pet-cock 76 and the valve 72 in the water supply-pipe are opened. Water under pressure then enters the radiator and forces the air out of the pet-cock, which is closed as soon as water is discharged therefrom, whereby the radiator is subjected to the water pressure and may be examined at all points by revolving the supporting-frame. If upon examination it is found that the radiator is free of leaks, the valve 72 in the water supply-pipe is closed, and the valve 70 in the air supply-pipe and the valve 74 in the water discharge-pipe are opened; whereupon the air under pressure enters the radiator and forcibly ejects the water from the radiator through the discharge-pipe, carrying with it any fine particles of sand remaining from the core or any other loose matter therein.

In Fig. 14 I have shown my improved assembling machine in use for assembling and connecting a sectional water radiator.
When so used, I employ a different bearing-block 77 on the header of the abutment; said block having a passage 78, and a pipe 79 threaded into said passage and provided with a pet-cock 80 or analogous device.

When testing a water-radiator, the pet-cock 80 and the valve 72 in the water supply-pipe is opened, the water under pressure entering the radiator and forcing the air therefrom through the open pet-cock. When water appears at the pet-cock, it is closed; the radiator is then carefully examined and if found tight the valve in the water supply-pipe is closed, and the valves in the air-supply-pipe and the water discharge pipe are opened, thus admitting air under pressure to eject the water from the radiator through said discharge-pipe. In this manner the assembled radiator may be conveniently tested under pressure without removing it from the machine, and in order that all parts of the radiator may be carefully scrutinized while testing the same, the supporting-frame may be turned as shown in Fig. 5.

In order that the controlling-valve 55 may be operated from any point along the length of the machine, a lever 81 is secured thereto which has attached to its outer end a rod 82 that extends the full length of the machine and is slidably supported in a support 83 secured to the head 26 or in any other manner.

While the construction shown and described herein is the preferred one, it is to be understood, that variations and changes may be made therein without departing from my invention or sacrificing any of the advantages thereof.

Having thus described my invention, what I claim is,—

1. In a radiator assembling-machine, the combination with two pairs of standards, of a guide-rod supported on one pair of said standards, a support slidable and rotatable on said guide-rod, an abutment, a follower adjustable on said support and movable therewith, a cylinder supported by the other pair of standards, and a piston within said cylinder having connection with said support.

2. In a radiator assembling-machine, a support on which the radiator sections are laid, an abutment, and a follower adjustable longitudinally on said support; combined with a cylinder having pipes for the admission and discharge of a power-medium, a piston reciprocal within said cylinder and having connection with said support, a valve governing the admission to and discharge of the power medium from said cylinder, and a rod extending the full length of the support and connected to said valve.

3. In a radiator assembling-machine, the combination of a support comprising a plurality of bars and heads supported to allow a limited rotary movement, said heads having curved slots in which said bars are adjustably secured, an abutment and a follower movable toward and from said abutment and both located between said heads, said abutment and follower having slots through which said bars are passed, and which coincide with those of said heads, and a power-device for moving said follower toward and from said head.

4. In a radiator assembling-machine, the combination with a support comprising a plurality of parallel bars and supported heads at the ends of said bars capable of limited rotary motion, said heads having curved slots whose centers are coincident with the axis of said heads and in which slots the ends of said bars are adjustably secured, an abutment and a follower having curved slots through which said bars are passed and which coincide with those of the heads, means for adjusting and maintaining the follower in any adjusted position on said bars, and power-mechanism for moving said support lengthwise.

5. In a radiator assembling-machine, the combination with two pairs of standards, a cylinder supported on one pair of said standards, a power-actuated piston within said cylinder, and a guide-rod supported on the other pair of said standards, of a support comprising a plurality of parallel bars and heads connecting the ends of said bars, one of said heads being connected with said piston but being capable of rotation independent of the latter, and the other head being slidable and rotatable on said guide-rod, an abutment, and a follower adjustably secured to said parallel bars and between which and said abutment the radiator sections are placed to be connected on movement of said support with the piston.

6. In a radiator assembling-machine, the combination with a power-device, a support on which the radiator sections are placed, an abutment, and a follower held on said support and movable toward and from said abutment, the latter being provided with means to introduce water under pressure into the connected sections and to allow the escape of air therefrom.

7. In a radiator assembling-machine, the combination with a power-device, of a support connected with said power-device and on which the radiator sections are placed, a follower adjustable on said support and movable therewith, and an abutment against which one end section abuts and which has a water-passage and an air-passage in communication with the interior of the assembled sections.

8. In a radiator assembling-machine, the combination with a power-device, a support for the radiator sections comprising parallel bars and heads having segmental slots in which the ends of said bars are adjustably secured, an abutment and a follower movable toward and from said abutment and both having segmental slots coinciding with those of said heads and through which said bars are passed, and an adjustable header on said follower and on said abutment against which the end sections bear.

9. In a radiator assembling-machine, the combination with a power-device, a support for the radiator sections comprising parallel bars and heads having segmental slots in which the ends of said bars are adjustably secured, an abutment and a follower movable toward and from said abutment and both having segmental slots coinciding with those of said heads and through which said bars are passed, adjustable headers on said follower and on said abutment, and bearing-blocks transversely adjustable on said headers, against which the end sections of the radiator bear.

10. In a radiator assembling machine, the combination with a cylinder-confined piston, of a support having connection with said piston in a manner to permit rotation independent of said piston, a follower carried on said support, an abutment located between said piston and said follower, and means to carry said support, piston, and abutment.

In testimony whereof, I have affixed my signature in the presence of two subscribing witnesses.

WILLIAM C. McKEOWN.

Witnesses:
GEORGE S. WATERS,
EMIL NEUHART.